United States Patent [19]
Tendler

[11] Patent Number: 5,598,460
[45] Date of Patent: Jan. 28, 1997

[54] EMERGENCY BACK-UP SYSTEM FOR ENHANCING RELIABILITY OR RESCUE

[75] Inventor: Robert K. Tendler, Chestnut Hill, Mass.

[73] Assignee: Tendler Cellular, Inc., Boston, Mass.

[21] Appl. No.: 600,345

[22] Filed: Feb. 9, 1996

[51] Int. Cl.$^6$ .................................................. H04M 11/00
[52] U.S. Cl. .................. 379/59; 379/37; 379/45
[58] Field of Search ...................... 379/37, 38, 40, 379/45, 49, 51, 201, 58, 59

[56] References Cited

U.S. PATENT DOCUMENTS

| | | | |
|---|---|---|---|
| 4,924,491 | 5/1990 | Compton et al. | 379/37 |
| 5,249,223 | 9/1993 | Vanacore | 379/45 X |

*Primary Examiner*—Curtis Kuntz
*Assistant Examiner*—G. J. Oehling
*Attorney, Agent, or Firm*—Robert K. Tendler, Esq.

[57] ABSTRACT

A system is provided for enhancing the reliability of rescue services by providing a 911 back-up system in which the termination of an emergency call is sensed followed by dialing the telephone number of a predetermined dispatch office, with the dispatch office providing a call back to the nearest PSAP to ascertain whether or not rescue is on the way. In one embodiment for cellular phone applications, termination of the emergency call is sensed by detecting the call-in-progress flag available on the phone's bus. In another embodiment, the originating phone transmits the telephone number of the originating phone to permit personnel at the dispatch office to call the originating phone back to ascertain the nature of the problem and if dispatched help has arrived.

9 Claims, 2 Drawing Sheets 5,598,460

EMERGENCY BACK-UP SYSTEM FOR ENHANCING RELIABILITY OR RESCUE

FIELD OF INVENTION

This invention relates to rescue systems and, more particularly, to a 911 back-up system for providing assurance that rescue is on the way.

BACKGROUND OF THE INVENTION

As is well known, 911 is utilized as an emergency number which, when called, is routed to a public service access point or PSAP. It is of importance that the person rescued be able to ascertain whether help is on the way. In the past, PSAP'S through E911 and Automatic Number Indentification and Automatic Location Information software have been able to locate the stricken individual by virtue of having the address of the calling phone.

However, in mobile and cellular applications, it is only with extreme difficulty that the location of the stricken individual can be ascertained. In most instances, the stricken individual must be queried by the PSAP operators in order to be instructed by the stricken individual as to his or her whereabouts. This system is problematical both because of non-reliable personnel at the PSAP as well as the problem of ascertaining location.

In recent studies, it has been ascertained that the abilities of personnel taking emergency calls at PSAPS leaves a great deal to be desired. In study after study, PSAP operators have been found to inaccurately determine both the nature and the location of an accident or stricken individual. In extreme cases, PSAP operators have even been filmed as being asleep at their stations.

The above necessitates a system for effectuating reliable rescue in the face of systems manned, on occasion, by untrained personnel, inproperly trained personnel, or personnel who, while properly trained, inadequately determine the location of the stricken individual or the problem to be remedied.

Studies also show that emergency personnel are often directed to the wrong location or are given a wrong priority code which results in improper triage, oftentimes resulting in exorbitant delays in the arrival of medical or police personnel.

While in most instances the E911 systems work reasonably well, there are now an alarming number of situations in which rescue is not effectuated in a timely manner due to problems at the PSAP.

While the above problems exist in land line applications, where the location of the caller is ascertained by virtue of the physical address of the dwelling, in cellular phone and mobile applications, this information is either nonexistent or, when given, may be inaccurate.

SUMMARY OF INVENTION

In order to solve the problem of timely rescue in the subject system, as adapted for cellular phones, the call-in-progress indicator flag produced by the cellular phone, when down, indicates the termination of the cellular 911 call. In response thereto, the cellular phone is made to dial a dispatch center or office in which the center is given the identity of the caller by telephone number, as well as the caller's location through the utilization of a global position satellite or GPS receiver at the cellular phone.

Upon receipt of the 911 back-up call from the cellular phone, means within the dispatch center are utilized, first to call back the cellular phone making the call to ascertain if the individual requires help or whether help has in fact arrived. The dispatcher can also ascertain whether or not the help is adequate, assuming the stricken individual is able to communicate.

Thereafter, means are provided at the dispatch center to dial the nearest PSAP based on the location of the phone, be it land line or cellular, and the PSAP is dialed up on a back line so that individuals at the PSAP can be queried by operators at the dispatch center to ensure that rescue units are on the way and to, in general, ride herd on the PSAP to make sure of quality and rapidity of response.

In one embodiment in cellular phone applications, the cellular telephone ascertains by its own internal GPS receiver its position, and radios this position to the aforementioned dispatch center. The message transmitted to the dispatch center is one including the cellular phone telephone number as well as the cellular phone location. In a further embodiment, this is accomplished through the utilization of synthetic voice transmission of the cell phone number and the location, thereby eliminating any additional infrastructure at the dispatch center. The elimination of infrastructure permits the same message to be decoded at the PSAP and then retransmitted to the dispatch center in a totally infrastructureless system in which the format of the information is spoken language, in one embodiment, English.

A system for increasing the reliability of rescue is thus provided through the utilization of means for detecting the ending of an emergency call, followed by the dialing of a telephone number of a dispatch center, with the dispatch center providing a call back, both to the phone initiating the call and then to the closest PSAP so that questions can be asked to ascertain whether help is on the way, and whether it is the right type and quality of help.

In summary, a system is provided for enhancing the quality of rescue services by providing a 911 back-up system in which the termination of an emergency call is sensed followed by the dialing of a predetermined dispatch office number, with the dispatch office providing a call back to the nearest PSAP to ascertain whether or not rescue is on the way. In one embodiment for a cellular phone application, termination of the emergency call is sensed by detecting the call-in-progress flag available on the phone's bus. In another embodiment, the originating phone transmits the telephone number of the originating phone to permit personnel at the dispatch office to call the originating phone back to ascertain the nature of the problem and if dispatched help has arrived.

BRIEF DESCRIPTION OF THE DRAWINGS

These and other features of the subject invention will be better understood taken in conjunction with the Detailed Description in conjunction with the Drawings of which.

DETAILED DESCRIPTION

Figure 1:
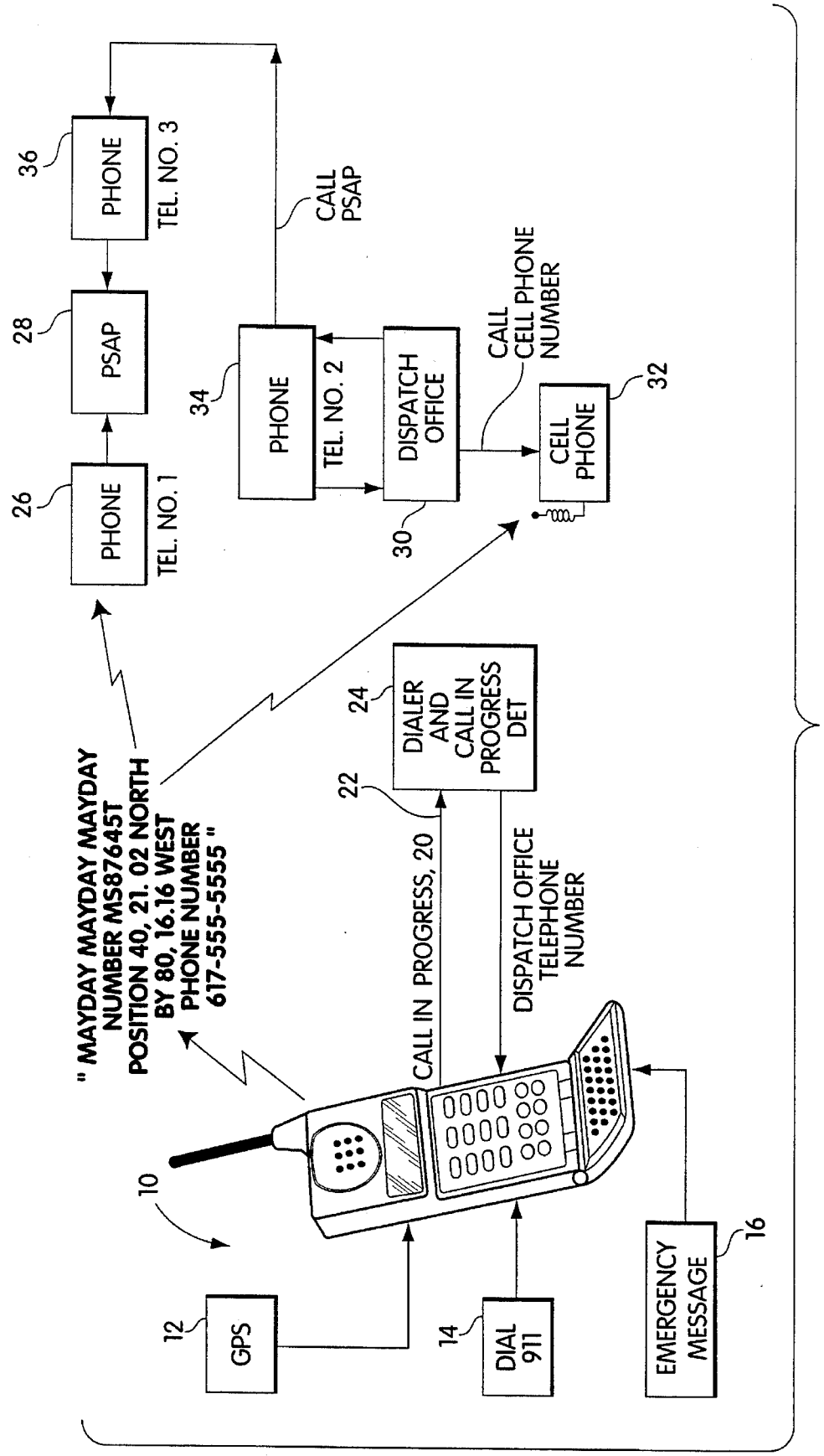
FIG. 1 is a block diagram of the subject system indicating the utilization of a cellular phone in which a call-in-progress indicator flag is sensed to initiate the 911 back-up calling sequence; and, FIG. 2 is a detailed block diagram of the system of FIG. 1 showing the bus structure of a cellular phone and the detection of the call-in-progress flag.

Referring now to FIG. 1, a 911 back-up system is depicted in which a cellular phone 10, when activated, initially transmits a MAYDAY Message to a PSAP 28 by dialing a first predetermined number, for example, 911 and annunciating "MAYDAY, MAYDAY, MAYDAY 810STLNY, Position 40.21.02 North by 80.16.03 West, Phone Number 617-555-5555" via synthesized voice. This MAYDAY Message is received by telephone 26 at the PSAP 28 via a cellular network (not shown). The location of cellular phone 10 is given by a global position satellite or GPS receiver 12 coupled to the phone. A specialized 911 activation button 14 may be utilized to cause phone 10 to dial the 911 number. The emergency message is generated by a voice synthesizer 16 which modulates phone 10 to provide the emergency message.

At the time that a call is made, a call-in-progress flag 20 is applied via line 22 to a dialer and call-in-progress detector 24, which detects the fact that a 911 call has been initiated and is in progress. When the call ceases, the call-in-progress flag 20 drops, indicating that the phone call has terminated. It is the function of the call-in-progress detector to detect that the call has been terminated whether or not it is done by means of a call-in-progress flag or some other mechanism.

Upon the sensing of the termination of the original 911 call, dialer 24 causes phone 10 to dial a second predetermined number of a telephone 34 at a dispatch center or office 30 which has a number of operators standing by to receive the original MAYDAY Message. In one embodiment, incorporated in the MAYDAY Message is the telephone number of the cellular phone. In this embodiment, the first step is for the operator at the dispatch office, through the utilization of a cellular phone 32, to call back the cellular phone making the distress call by dialing the cellular phone number. If the operator of the cellular phone is able to communicate, the dispatch office can ascertain the nature of the problem and whether help has arrived.

In any event, the dispatch office utilizes the telephone 34 to call a third predetermined number of a telephone 36 at the nearest PSAP, with the nearest PSAP being identified by virtue of the cellular phone having broadcast its position.

As can be seen, what is provided is a 911 back-up service and system in which after an emergency 911 call has been placed and received at a PSAP, a dispatch office is alerted, with the dispatch office riding herd on the PSAP by placing a call over its land line to the appropriate PSAP office. By so doing, the initiator of the emergency call, can have a greater degree of confidence that help is on the way and that someone is looking after his or her problem.

Figure 2:
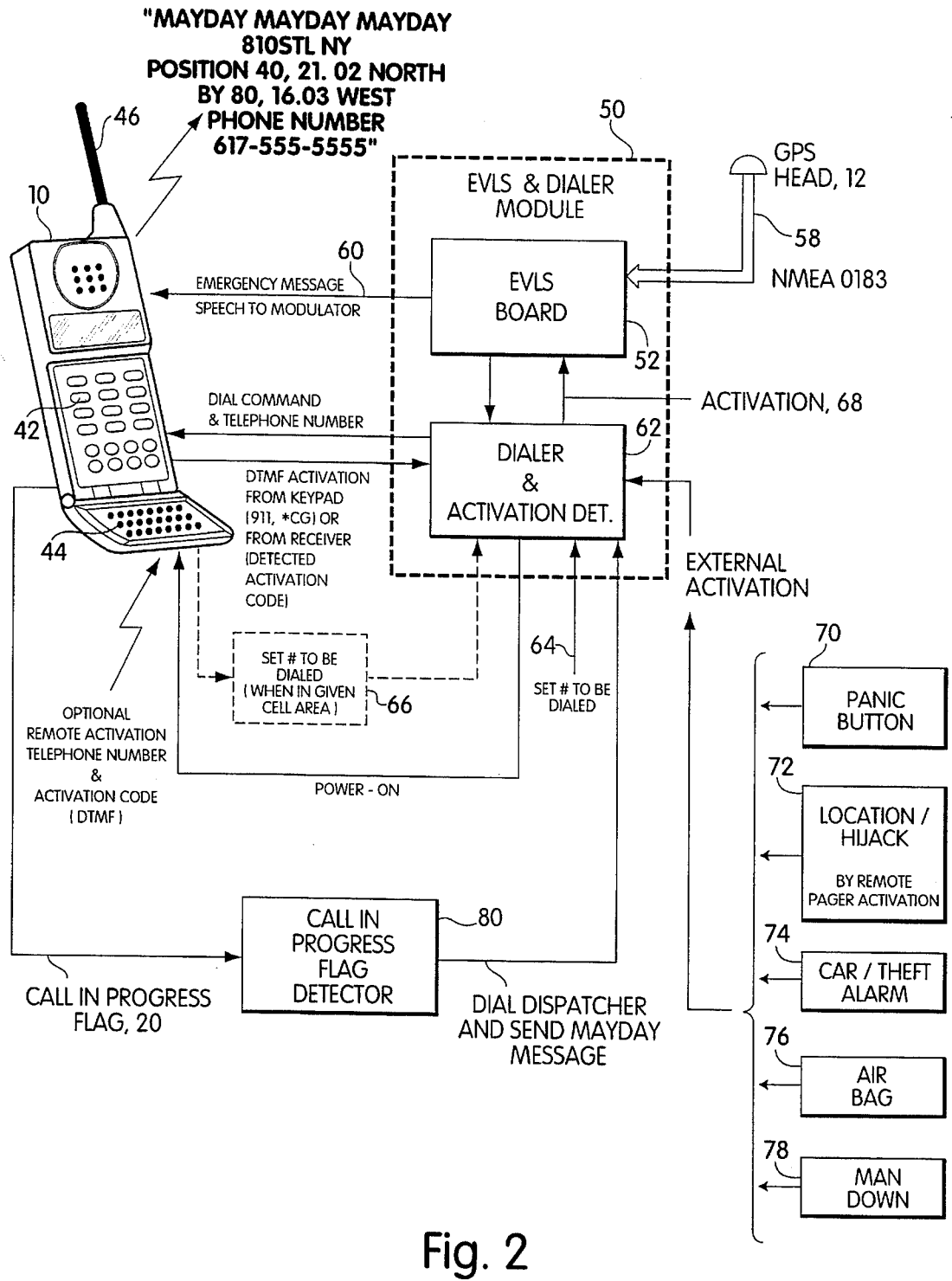

Referring now to FIG. 2, cellular phone 10 is shown as having a keypad 42, a microphone 44, and a suitable antenna 46. Coupled to the cellular phone is an Emergency Vehicle/Vessel or person Location System or EVLS and dialer module 50. Module 50 is also coupled between the keypad and the cellular phone transceiver to be able to interrupt selected key pad signals prior to transmission to the transceiver. This permits the module to respond to EVLS-related keypad actuation and to place the appropriate signals on the bus between the keypad and the transceiver. Thus, the module can interrupt and replace keypad commands. It is noted that for some cellular phones, the keypad controls the DTMF tone generator within the transceiver. By interrupting and altering the keypad signals to the tone generator within the transceiver, functions attributed to the dialer and activation detector and module 50 can be duplicated. However, for convenience in describing the subject system, it will be assumed that DTMF tones are generated by the keypads and are both detected at and generated in the module. EVLS board 52 contains a location detection circuit for detecting the location determined by GPS 12 transmitted to board 52 via an NMEA 0183 interface bus 58. The function of the location detection circuit is to derive a number which is then verbalized, along with a message that is preencoded and provided to a conventional speech synthesizing circuit which synthesizes a predetermined message and provides it over Line 60 to the modulation section of the telephone.

It will be appreciated that location detection and speech synthesis is now commonplace and is available from ACR Electronics, Inc. of Fort Lauderdale, Florida, as ACR Model Number EVLS-1000.

It is the purpose of the EVLS board to decode location and to provide the emergency message which includes the fact of an emergency and the location of the vehicle/vessel or person at which the EVLS and dialer module is located.

This message may be repeated once or as many times as required, with the message being transmitted either on a time basis by the actuation of any key in keypad 44, or even by voice operated relays of voice command should such be desired.

In order to activate the EVLS board, dialer and activation detector 62 includes a DTMF detector for detecting DTMF tones or equivalent bus signals from keypad 12. It also can be made to respond to any DTMF tone available from the audio output circuit of the phone which is sent from a remote location to the cellular phone, such as a predetermined code to have the system dial a predetermined number to give the location of the vehicle/vessel or person. Conventional programming determines which DTMF tone will be acted upon and the consequence of the action.

Upon detection of DTMF tones or equivalent bus signals which cause the activation of the unit, the dialer portion causes the cellular phone to go off hook and dial the telephone number that has been preset into the dialer. This number can be preset in any number of conventional ways as illustrated at 64, or optionally as illustrated at 66. The number to be dialed can be obtained by receipt of remotely generated signals transmitted to the cellular phone transceiver such that the number to be dialed can be determined, for instance, by predetermined signal from a cell sight within range of the cellular phone.

It will be appreciated that upon activation, an activation signal over line 68 is applied to EVLS Board 52, such that upon providing an off hook condition to the cellular phone, the EVLS board is actuated to modulate the modulator section of the transmitter for the cellular phone.

As illustrated, external activation can come from a remotely located Panic Button 70, Pager Activation 72, Car Theft Alarm Activation 74, Airbag Activation 76, or Man Down Activation 78.

While the following describes normal operation of the initial transmission of the MAYDAY Message to the PSAP'S, a Call-In-Progress detector 80, receives Call-In-Progress flag 20 and causes dialer 62 to dial the forementioned dispatch office number through the mechanisms described hereinbefore.

The Call-in-Progress flag going up indicates an off-hook condition, whereas the Call-in-Progress flag going down indicates an on-hook condition. The Call-in-Progress flag, thus, indicates an on-going call and when the call is terminated or dropped.

It will be appreciated, therefore, that a system is provided for sensing when an emergency transmission has been terminated and provides a back-up call, first to the originating phone, and then to the PSAP nearest the caller. The service provides an increased level of confidence that help from the PSAP will in fact be forthcoming. While the subject system has been described in connection with cellular phones, the 911 back-up system includes use with land line phones.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for increasing the reliability of rescue comprising:

a first telephone at one location;

means at said first telephone for initiating an emergency call by calling a first predetermined number;

means associated with said first telephone responsive to the initiating of said emergency call for reporting the location thereof;

a public service access point at a second location including a second telephone having said first predetermined number for receiving calls and means for dispatching rescue services responsive to a received call;

means at said first telephone for detecting the occurrence and termination of said emergency call;

means at said first telephone responsive to the detected termination of said emergency call for causing said first telephone to call a second predetermined number and report the fact of an emergency and said location; and, means including a dispatch center at a third location including a third telephone having said second predetermined number for receiving said reported emergency and location, for dialing a third predetermined number at said public service access point, for reporting the fact of said emergency and the location thereof, and for interrogating personnel at said public service access point location as to the status of the dispatch of said rescue services.

2. The system of claim 1 and further including means associated with said first telephone for reporting the telephone number thereof along with the report of said emergency.

3. The system of claim 2 wherein means at said dispatch center includes means for calling the telephone number of said first telephone for confirmation of said emergency.

4. The system of claim 1 wherein said public service access point includes a fourth telephone constituting a back line thereat, and wherein said fourth telephone has said third predetermined telephone number as its number.

5. The system of claim 1 wherein said first telephone is a cellular telephone.

6. The system of claim 5 wherein said cellular telephone includes a bus and a call-in-progress flag on said bus, and wherein said means for detecting the occurrence of said emergency call termination includes means for detecting said call-in-progress flag.

7. The system of claim 1 wherein said first predetermined number is 911, whereby said system is a 911 back-up system.

8. The system of claim 1 wherein said means for reporting said emergency includes a speech synthesizer.

9. The system of claim 1 wherein said means for reporting said location includes a speech synthesizer.

* * * * *